Feb. 15, 1955   M. M. CUNNINGHAM   2,702,115
BELT CONVEYER TROUGHING STRUCTURE
Filed May 28, 1954   2 Sheets-Sheet 1
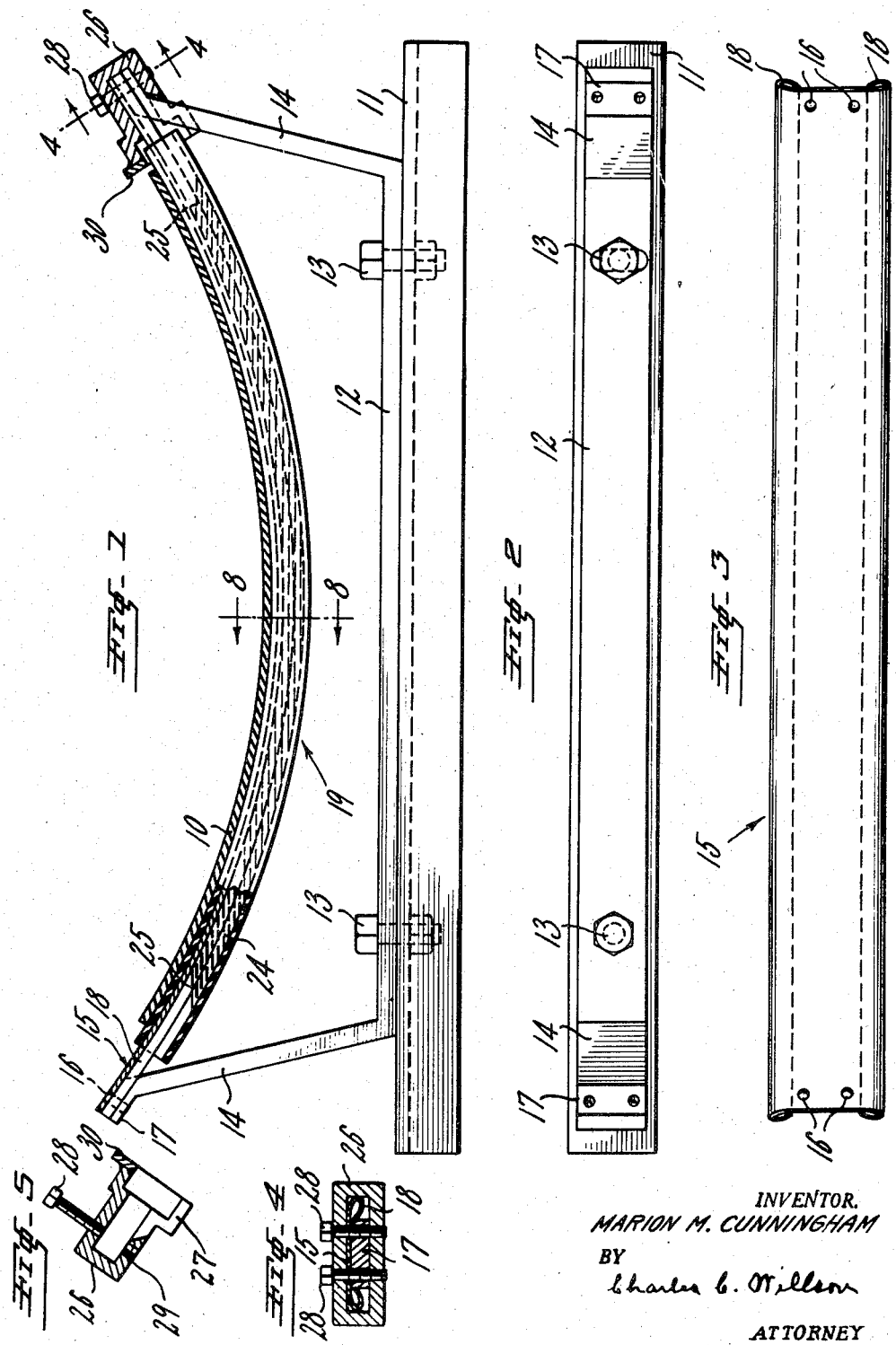
INVENTOR.
MARION M. CUNNINGHAM
BY
Charles C. Willson
ATTORNEY

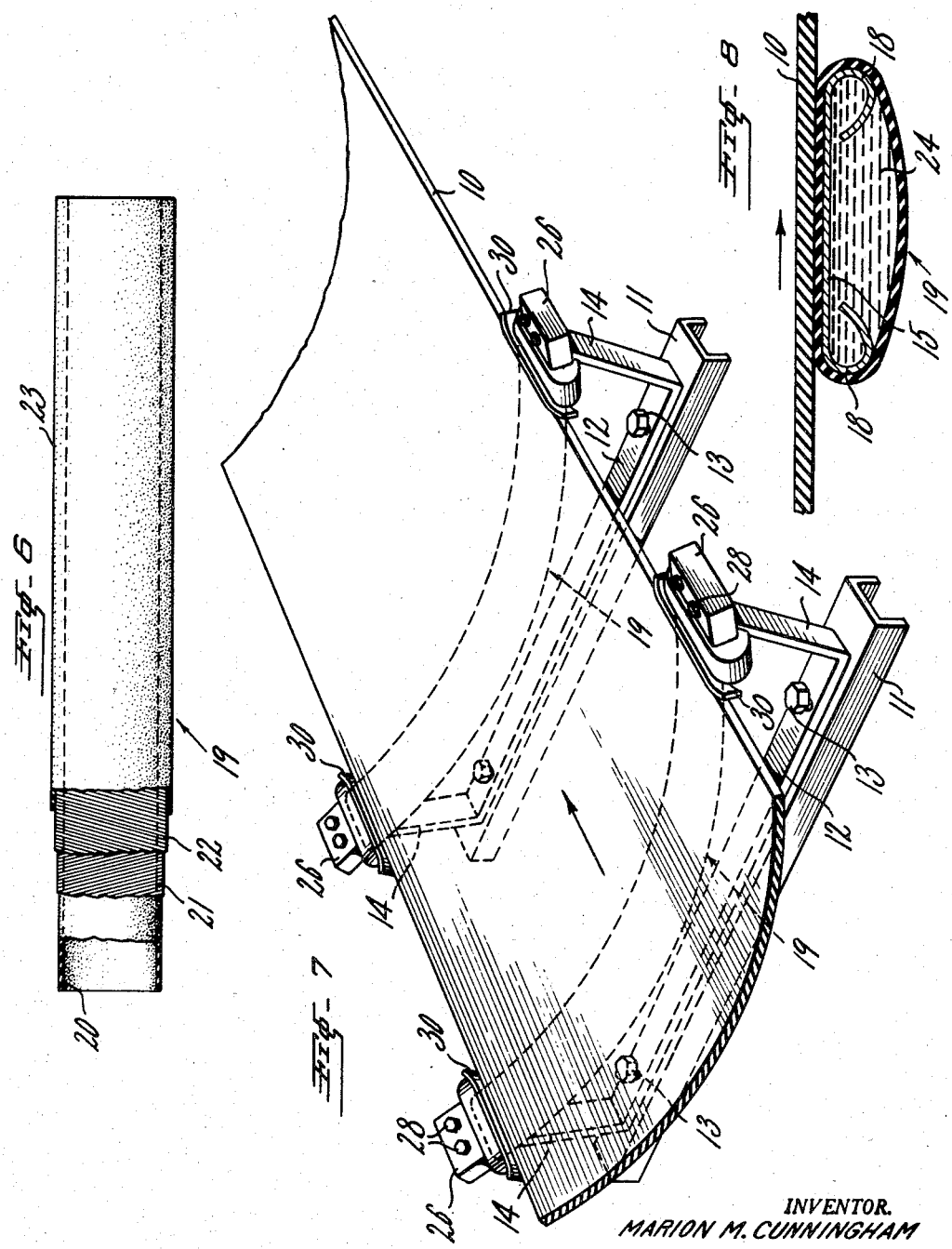

United States Patent Office 2,702,115
Patented Feb. 15, 1955

2,702,115

BELT CONVEYER TROUGHING STRUCTURE

Marion M. Cunningham, New York, N. Y.

Application May 28, 1954, Serial No. 432,979

5 Claims. (Cl. 198—191)

This invention relates to belt conveyers having a trough-shaped upper run for conveying loose materials such as coal, ore, sand, and the like, and more particularly to novel anti-friction means for supporting the load-bearing run of the belt.

Belt conveyers having a trough-shaped upper run are usually provided, at spaced intervals along their length, with supporting rolls designed to support the belt so that it will form a trough, but these rolls require frequent maintenance care in that they have to be lubricated, cleaned, and adjusted, and occasionally renewed. Furthermore, they consume a larger proportion of the power imparted to the load-bearing belt to drive the same.

The present invention contemplates an extremely simple and inexpensive type of anti-friction means for supporting the load-bearing run of a belt conveyer in the form of a trough so that the belt may be driven smoothly and quietly with very little friction.

One important feature of the present invention resides in bars or beams that are suspended transversely of the belt path to support its load-bearing run, and are curved in the direction of their length to the transverse curvature of the belt. Over each bar is placed a flexible sleeve or hose that forms an anti-friction surface between the bar and belt. The arrangement is such that as the belt is driven, the sleeve will rotate upon its curved bar at the speed of the moving belt. This forms a quiet, durable and inexpensive anti-friction means for supporting the curved belt throughout its width.

Another important feature of the present invention resides in a novel procedure for lubricating the anti-friction means of the present invention. The anti-friction sleeve is supported in the form of an arc with its ends elevated. It, therefore, forms a very satisfactory oil receptacle which will hold sufficient oil to lubricate the surfaces between the supporting bar and sleeve for many months of use, without requiring any attention.

The ample supply of lubricant, such as oil, retained in the bent sleeve will cause the sleeve to slide or rotate freely upon the upper surface of the curved bar, as the belt advances. As a result, the upper run of the belt is supported throughout its transverse curvature without the use of any moving metal parts, and the sleeve acts as a cushion between the bar and belt. The lower run may be supported in a similar manner. The interior of the sleeve and oil therein can be kept clean by providing each end of the sleeve with a cap which will exclude dirt, dust and rain water therefrom.

The above and other features of the present invention will be further understood from the following description when read in connection with the accompanying drawings, wherein:

Fig. 1 is a transverse sectional view through a belt conveyer and the anti-friction supporting means of the present invention for supporting the belt.

Fig. 2 is a top plan view of the beam and load supporting bracket shown in Fig. 1.

Fig. 3 is a top plan view of a longitudinally curved bar that is normally supported in a suspended position by the bracket of Fig. 2.

Fig. 4 is a sectional view taken on the line 4—4 of Fig. 1.

Fig. 5 is a longitudinal sectional view through one of the end caps for the bar of Fig. 1.

Fig. 6 is a side view with parts in section of a length of sleeve or hose to be described.

Fig. 7 is a perspective view of a length of the belt conveyer of Fig. 1 and of spaced supporting means for supporting the belt in the form of a trough; and Fig. 8 is a sectional view taken on the line 8—8 of Fig. 1.

The load-bearing belt 10 may be of usual or well-known construction, as the present invention does not reside in the construction of the belt, but rather in novel anti-friction means for supporting the belt so that its upper run will form a load-bearing trough extending longitudinally thereof. The belt conveyer 10 may be several feet wide and may be used to convey iron ore, coal, sand, grain, or other loose materials, which are to be moved from one point to another.

These belt conveyers have usually been supported heretofore by a series of rolls which require considerable care. The present invention contemplates an extremely simple anti-friction means for supporting the load-bearing run of the belt 10 in the form of a trough, and which anti-friction means has no moving metal parts and requires very little attention.

In accordance with the present invention the trough-shaped upper run 10 of the belt conveyer is supported at spaced intervals by the means best shown in Fig. 7, wherein each belt-supporting unit comprises a supporting beam such as a channel bar 11 that may rest upon concrete or other type of firm base, not shown. To the upper face of this channel bar 11 is bolted a relatively long bracket having the horizontally extending portion 12 which is secured by bolts 13 to the channel bar 11, and this horizontally extending portion has the upwardly extending legs 14 adapted to support in a suspended condition a longitudinally curved bar 15, which is well illustrated in Fig. 3. This bar 15, which preferably is formed of sheet metal, has bolt holes 16 near each end thereof. The purpose of these holes is to receive securing bolts which will fasten the end portions of the bar 15 securely to the inclined upper end portion 17 of each leg 14. The longitudinally curved bar 15 is conveniently made of sheet steel and may have in cross-section the shape shown in Fig. 8, wherein, it will be noted that the upper load-supporting surface of this bar is relatively flat; whereas each longitudinal edge thereof is bent downwardly in the form of a loop as indicated by 18. The bar 15 is preferably curved throughout its length in the form of an arc or catenary so as to impart to the belt 10 resting thereupon the desired trough shape. This bar 15, it will be noted, is supported only at its opposite ends so that it is suspended between the upwardly extending legs 14.

The belt 10, while supported by the longitudinally curved bars 15, does not contact these bars; for, obviously, if the belt 10 contacted these bars when heavily loaded, the friction between the belt and bars would be extremely high. In order to provide a minimum amount of friction between the belt 10 and bars 15 extending transversely of the belt at spaced intervals along its length, each bar 15 is covered by a flexible sleeve or hose 19 which preferably is constructed as best shown in Fig. 6. This sleeve is shown as having a tubular inner lining 20 formed of oil-resistant rubber or flexible plastic such as Buna-N, neoprene, nylon, or the like. About the oil-resistant lining 20 is preferably provided a serving 21 of strong, flexible, heavy yarn such as nylon, and in which the windings extend at a slight angle, say approximately 75° to the longitudinal axis of the hose. About this inner winding 21 is provided a second or outer winding 22 which may be formed of the same type of yarn and which is also wound at an angle of about 75° to the longitudinal axis of the hose; but the windings of the inner serving should incline in one direction and the windings of the outer serving should incline in the opposite direction, so that these windings form an included angle of approximately 30° to each other, as shown in Fig. 6. This 30° angle is much smaller than that usually employed in the servings of flexible hose, for example, but is deemed desirable in the present case because the sleeve or hose shown in Fig. 6 will be subjected to strong transverse strains but very little longitudinal strain. The outer serving 22 is preferably protected by a coating of neoprene 23, or other strong, durable, water-impervious, flexible material.

The sleeve or hose shown in Fig. 6 and just described is placed over the longitudinally curved bar 15, as shown in Fig. 8, and the length of this sleeve should exceed by at least several inches the width of the belt 10, which is to rest thereupon, so that no portion of the belt will come into direct contact with the metal supporting bar 15. The arrangement is such that as the belt 10 advances in the direction of its length as indicated by the arrows in Figs. 7 and 8, the sleeve 19 will rotate upon the bar 15 at the speed at which the belt travels; and in order to reduce to a minimum the friction between the sleeve supporting bar 15 and the sleeve 19, this sleeve at all times should be kept approximately filled with a light-grade lubricating oil such as indicated by 24. Since the sleeve 19 is supported by the bar 15 in the form of an arc with its ends elevated, the intermediate portion of this sleeve provides an excellent oil-retaining receptacle. The level of the oil 24 within this sleeve should be maintained approximately at the point indicated by 25 in Fig. 1. This construction insures that an ample supply of lubricating oil will at all times be provided between the surface of the bar 15 and the inner surface of the sleeve which engages and rotates upon this bar at the speed at which the belt travels. The upper active surface of the bar 15 may be given any desired width and may be crowned somewhat, if desired.

Since belt conveyers are frequently hundreds of feet long and may operate in the open air where they are exposed to the weather, it is desirable to close the opposite ends of the sleeve 19 so as to keep out dirt, dust, rain and snow. To accomplish this, each upper end of a leg 14 and end of a beam 15, secured thereto, are provided with a cap such as indicated by 26, which cap is preferably shaped as shown in Figs. 1 and 5, and the lower portion of the cap is preferably cut away as indicated at 27 to clear the upwardly extending leg 14. This cap 26 is shown as provided with two bolts 28 which extend through a hole in the upper portion of the cap, then through the hole 16 formed in an end portion of the bar 15 and through holes in the laterally extending portion 17 of an upright 14. They are then screwed into the threaded holes 29 formed in the lower wall of the cap. This provides a simple, strong and durable means for securing the cap and end of the beam 15 firmly to the upwardly extending support 17 of the leg 14.

Since belt conveyers may tend to work laterally from their desired longitudinal path, this is prevented by mounting on each end portion of the bars 15 in contact with a cap 26 a metal guide 30, against which the edge of the belt may rub if it works laterally from its proper longitudinal path. The tendency of the belt to rub against a metal guide plate 30 can be reduced by adjusting one end portion of a supporting bracket 12 laterally slightly relatively to the advancing belt to maintain a 90° angle relationship between the belt and support. To permit this, the bracket 12 is provided near its right-hand end, see Fig. 2, with an elongated slot for the clamping bolt 13.

It will be seen from the foregoing that the anti-friction means herein described for supporting the load-bearing run of a belt conveyer is simple in construction, has no moving metal parts, and contains a large supply of lubricating oil, which is well protected from dirt and the weather. As a result, these anti-friction supports will require very little service, such for example, as the adding of oil to each sleeve say once in six months or so. Furthermore, when a lubricant is provided between a metal surface and a rubber surface, one will slide freely upon the other; therefore, the anti-friction means herein contemplated for supporting a belt conveyer will permit the load-bearing belt to be driven by considerably less power than has been required heretofore to drive a belt carrying the same amount of load.

Only the upper load-bearing run of the belt conveyer 10 is shown in the drawing. The lower run, if desired, may also be provided with anti-friction supporting means such as herein contemplated.

Having thus described my invention, what I claim and desire to protect by Letters Patent is:

1. A belt conveyer having a load-bearing run bent transversely to form a trough extending lengthwise of the run, spaced bars suspended transversely of the run to support said run and curved in the direction of their length to the transverse curvature of said run, and anti-friction means between the bars and belt comprising a flexible sleeve that surrounds each bar and slides thereon about the bar at the speed of the moving run.

2. A belt conveyer having a load-bearing run bent transversely to form a trough extending lengthwise of the run, spaced bars suspended transversely of the run to support said run and curved in the direction of their length to the transverse curvature of said run, and anti-friction means between a bar and run comprising a flexible sleeve that surrounds a bar throughout the width of the belt and slides thereon about the bar as the belt travels.

3. A belt conveyer having a load-bearing run that is bent transversely to form a trough, transversely extending bars for supporting said run and suspended from their ends like a catenary member that imparts a trough shape to said run, anti-friction means between the bars and run comprising a flexible sleeve enclosing each bar and adapted to slide thereon about the bar as the belt advances.

4. A belt conveyer having a load-bearing run that is bent transversely to form a trough extending lengthwise of the belt, spaced bars supported at their ends to extend transversely of the belt in the form of a suspended arc and adapted to support said run in the form of a trough, belt-supporting means between the bars and belt comprising a flexible sleeve surrounding each bar throughout the width of the belt to turn upon the bar as the belt moves, and said sleeve forming a receptacle for a liquid lubricant that reduces the friction between the sleeve and bar.

5. A belt conveyer having a load-bearing run that is bent transversely to form a trough, transversely extending bars for supporting said run and suspended from their ends like a catenary member that imparts a trough shape to said run, anti-friction means between the bars and run comprising a flexible sleeve enclosing each bar and adapted to slide thereon about the bar as the belt advances, and said sleeve forming a receptacle that contains a lubricant which reduces the friction between the sleeve and bar.

No references cited.